US011810385B2

(12) United States Patent
Chen et al.

(10) Patent No.: US 11,810,385 B2
(45) Date of Patent: Nov. 7, 2023

(54) SUBJECT IDENTIFICATION BASED ON ITERATED FEATURE REPRESENTATION

(71) Applicant: Microsoft Technology Licensing, LLC, Redmond, WA (US)

(72) Inventors: Dongdong Chen, Bellevue, WA (US); Dengpan Fu, Beijing (CN); Jingdong Wang, Beijing (CN); Jianmin Bao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 17/135,315

(22) Filed: Dec. 28, 2020

(65) Prior Publication Data
US 2022/0207264 A1    Jun. 30, 2022

(51) Int. Cl.
*G06V 40/10*    (2022.01)
*G06V 20/20*    (2022.01)
*G06F 18/22*    (2023.01)
*G06F 18/25*    (2023.01)

(52) U.S. Cl.
CPC .............. *G06V 40/10* (2022.01); *G06F 18/22* (2023.01); *G06F 18/25* (2023.01); *G06V 20/20* (2022.01)

(58) Field of Classification Search
CPC ........ G06V 40/10; G06V 20/20; G06F 18/22; G06F 18/25
See application file for complete search history.

(56) References Cited

U.S. PATENT DOCUMENTS

| 10,176,405 | B1  |   | 1/2019 | Zhou et al. |
|------------|-----|---|--------|-------------|
| 10,275,683 | B2  |   | 4/2019 | Zhu et al.  |
| 2019/0205433 | A1 | * | 7/2019 | Lo .......................... G06F 18/211 |
| 2020/0125897 | A1 |   | 4/2020 | Wang et al. |
| 2020/0218888 | A1 |   | 7/2020 | Gong et al. |

(Continued)

FOREIGN PATENT DOCUMENTS

WO    2020043610  A1    3/2020

OTHER PUBLICATIONS

Ye, et al., "Coupled-View Based Ranking Optimization for Person Re-identification", In Proceedings of International Conference on Multimedia Modeling, Jan. 5, 2015, pp. 105-117.

(Continued)

*Primary Examiner* — David Perlman
(74) *Attorney, Agent, or Firm* — Alleman Hall Creasman & Tuttle LLP

(57) ABSTRACT

A computer-vision method includes recognizing a feature representation of a query image depicting an unknown subject. A similarity score is computed between the representation of the query image and feature representations of a plurality of gallery images collectively depicting two or more different subjects with at least two or more gallery images for each subject, and each gallery image having a label identifying which of the subjects is depicted. One or more updated feature representations of the query image are sequentially iterated based on one or more of the computed similarity scores. For each of the one or more updated feature representations, an updated similarity score is computed between the updated feature representation and the feature representations of each of the gallery images. The unknown subject is identified based on a gallery image having a highest updated similarity score.

18 Claims, 8 Drawing Sheets

(56) References Cited

U.S. PATENT DOCUMENTS

2020/0250406 A1* 8/2020 Wang ................. H04N 23/80
2020/0285896 A1 9/2020 Huang et al.

OTHER PUBLICATIONS

Zhang, et al., "Ordered or Orderless: A Revisit for Video based Person Re-Identification", In Journal of IEEE Transactions on Pattern Analysis and Machine Intelligence, Feb. 28, 2020, 8 Pages.

Zhang, et al., "Densely Semantically Aligned Person Re-Identification", In Proceedings of the IEEE Conference on Computer Vision and Pattern Recognition, Jun. 16, 2019, pp. 667-676.

Zheng, et al., "Joint Discriminative and Generative Learning for Person Re-Identification", In Proceedings of the IEEE Conference on Computer Vision and Pattern Recognition, Jun. 16, 2019, pp. 2138-2147.

Zheng, et al., "Person Re-identification: Past, Present and Future", In The Repository of arXiv:1610.02984v1, Oct. 10, 2016, 20 Pages.

Zheng, et al., "Pyramidal Person Re-Identification via Multi-Loss Dynamic Training", In Proceedings of the IEEE Conference on Computer Vision and Pattern Recognition, Jun. 16, 2019, pp. 8514-8522.

Zheng, et al., "Scalable Person Re-identification: A Benchmark", In Proceedings of International Conference on Computer Vision, Dec. 7, 2015, pp. 1116-1124.

Zheng, et al., "Unlabeled Samples Generated by GAN Improve the Person Re-Identification Baseline in Vitro", In Proceedings of the IEEE International Conference on Computer Vision, Oct. 22, 2017, pp. 3754-3762.

Zhong, et al., "Re-ranking Person Re-identification with k-reciprocal Encoding", In Proceedings of the IEEE Conference on Computer Vision and Pattern Recognition, 2017, pp. 1318-1327.

Arandjelovic, et al., "Three Things Everyone Should Know to Improve Object Retrieval", In Proceedings of IEEE Conference on Computer Vision and Pattern Recognition, Jun. 16, 2012, 8 Pages.

Bai, et al., "Re-Ranking via Metric Fusion for Object Retrieval and Person Re-Identification", In Proceedings of the IEEE Conference on Computer Vision and Pattern Recognition, 2019, pp. 740-749.

Bai, et al., "Sparse Contextual Activation for Efficient Visual Re-Ranking", In Journal of IEEE Transactions on Image Processing vol. 25, Issue 3, Mar. 2016, pp. 1056-1069.

Chen, et al., "Group Consistent Similarity Learning via Deep CRF for Person Re-Identification", In Proceedings of the IEEE Conference on Computer Vision and Pattern Recognition, Jun. 18, 2018, pp. 8649-8658.

Chum, et al., "Total Recall: Automatic Query Expansion with a Generative Feature Model for Object Retrieval", In Proceedings of the IEEE 11th International Conference on Computer Vision, Oct. 14, 2007, 8 Pages.

Daubechies, et al., "Iteratively Re-weighted Least Squares Minimization for Sparse Recovery", In The Repository of arXiv:0807.0575v1, Jul. 3, 2008, 35 Pages.

Devlin, et al., "BERT: Pre-training of Deep Bidirectional Transformers for Language Understanding", In The Repository of arXiv: 1810.04805v1, Oct. 11, 2018, 14 Pages.

Eom, et al., "Learning Disentangled Representation for Robust Person Re-identification", In Proceedings of the 33rd Conference on Neural Information Processing Systems, 2019, 12 Pages.

Felzenszwalb, et al., "A Discriminatively Trained, Multiscale, Deformable Part Model", In Proceedings of the IEEE Conference on Computer Vision and Pattern Recognition, Jun. 23, 2008, 8 Pages.

Fu, et al., "Improving Person Re-Identification With Iterative Impression Aggregation", In In Journal of Latex Class Files, vol. 14, Issue 8, Aug. 2020, 13 Pages.

Garcia, et al., "Discriminant Context Information Analysis for Post-Ranking Person Re-Identification", In Journal of IEEE Transactions on Image Processing vol. 26, Issue 4, Apr. 2017, pp. 1650-1665.

Garcia, et al., "Person Re-Identification Ranking Optimisation by Discriminant Context Information Analysis", In Proceedings of the IEEE International Conference on Computer Vision, Dec. 13, 2015, pp. 1305-1313.

Graves, et al., "Neural Turing Machines", In The Repository of arXiv:1410.5401v2, Dec. 10, 2014, 26 Pages.

Green, Peter J., "Iteratively Reweighted Least Squares for Maximum Likelihood Estimation, and Some Robust and Resistant Alternatives", In Journal of the Royal Statistical Society: Series B (Methodological) vol. 46, Issue 2, Jan. 1, 1984, pp. 149-192.

Hermans, et al., "In Defense of the Triplet Loss for Person Re-Identification", In The Repository of arXiv:1703.0773v4, Nov. 21, 2017, 17 Pages.

Jegou, et al., "A Contextual Dissimilarity Measure for Accurate and Efficient Image Search", In Proceedings of Computer Vision and Pattern Recognition, Jun. 2007, 9 Pages.

Kalayeh, et al., "Human Semantic Parsing for Person Re-identification", In Proceedings of the IEEE Conference on Computer Vision and Pattern Recognition, Jun. 18, 2018, pp. 1062-1071.

Kostinger, et al., "Large Scale Metric Learning from Equivalence Constraints", In Proceedings of the IEEE Conference on Computer Vision and Pattern Recognition, Jun. 16, 2012, 8 Pages.

Leng, Qingming, "Co-Metric Learning for Person Re-Identification", In Journal of Advances in Multimedia, Jul. 15, 2018, 10 Pages.

Leng, et al., "Person Re-Identification with Content and Context Re-Ranking", In Journal of Multimedia Tools and Applications vol. 74, Issue 17, Apr. 29, 2014, 26 Pages.

Li, et al., "Adaptive Feature Fusion via Graph Neural Network for Person Re-identification", In Proceedings of the 27th ACM International Conference on Multimedia, Oct. 21, 2019, pp. 2115-2123.

Li, et al., "DeepReID: Deep Filter Pairing Neural Network for Person Re-Identification", In Proceedings of the IEEE Conference on Computer Vision and Pattern Recognition, Jun. 24, 2014, 8 Pages.

Liao, et al., "Person Re-Identification by Local Maximal Occurrence Representation and Metric Learning", In Proceedings of the IEEE Conference on Computer Vision and Pattern Recognition, Jun. 7, 2015, pp. 2197-2206.

Liu, et al., "End-to-End Comparative Attention Networks for Person Re-Identification", In Journal of IEEE Transactions on Image Processing, vol. 26, Issue 7, Jul. 2017, pp. 3492-3506.

Luo, et al., "Spectral Feature Transformation for Person Re-Identification", In Proceedings of the IEEE International Conference on Computer Vision, Jun. 16, 2019, pp. 4976-4985.

Ma, et al., "Cross-Domain Person Reidentification Using Domain Adaptation Ranking SVMs", In Journal of IEEE Transactions on Image Processing vol. 24, Issue 5, May 2015, pp. 1599-1613.

Ye, et al., "Person Re-identification via Ranking Aggregation of Similarity Pulling and Dissimilarity Pushing", In Journal of IEEE Transactions on Multimedia vol. 18, Issue 12, Aug. 31, 2016, 14 Pages.

Martinel, et al., "Kernelized Saliency-Based Person Re-Identification Through Multiple Metric Learning", In Journal of IEEE Transactions on Image Processing vol. 24, Issue 12, Dec. 2015, pp. 5645-5658.

Mende-Siedlecki, et al., "The Neural Dynamics of Updating Person Impressions", In Journal of Social Cognitive and Affective Neuroscience, vol. 8, Issue 6, Apr. 19, 2012, pp. 623-631.

Paisitkriangkrai, et al., "Learning to Rank in Person Re-Identification With Metric Ensembles", In Proceedings of the IEEE Conference on Computer Vision and Pattern Recognition, Jun. 11, 2015, pp. 1846-1855.

Qin, et al., "Hello Neighbor: Accurate Object Retrieval with k-reciprocal nearest Neighbors", In Proceedings of the Computer Vision and Pattern Recognition, Jun. 20, 2011, pp. 777-784.

Salton, et al., "Improving Retrieval Performance by Relevance Feedback", In Journal of the American Society for Information Science, vol. 41, Issue 4, Jun. 1990, pp. 288-297.

Shen, et al., "Deep Group-shuffling Random Walk for Person Re-identification", In Proceedings of the IEEE Conference on Computer Vision and Pattern Recognition, Jun. 18, 2018, pp. 2265-2274.

(56) References Cited

OTHER PUBLICATIONS

Shen, et al., "Person Re-identification with Deep Similarity-Guided Graph Neural Network", In Proceedings of the European Conference on Computer Vision, Sep. 8, 2018, 19 Pages.

Song, et al., "Deep Metric Learning via Lifted Structured Feature Embedding", In Proceedings of the IEEE Conference on Computer Vision and Pattern Recognition, Jun. 27, 2016, pp. 4004-4012.

Suh, et al., "Part-Aligned Bilinear Representations for Person Re-identification", In The Repository of arXiv:1804.07094v1, Apr. 19, 2018, 20 Pages.

Sukhbaatar, et al., "End-To-End Memory Networks", In Journal of Advances in Neural Information Processing Systems, Dec. 7, 2015, 9 Pages.

Sun, et al., "Beyond Part Models: Person Retrieval with Refined Part Pooling (and A Strong Convolutional Baseline)", In Proceedings of the European Conference on Computer Vision, Sep. 8, 2018, 17 Pages.

Vaswani, et al., "Attention Is All You Need", In Proceedings of the 31st Conference on Neural Information Processing Systems, Dec. 4, 2017, 11 Pages.

Wang, et al., "Learning Discriminative Features with Multiple Granularities for Person Re-Identification", In Journal of ACM Multimedia Conference on Multimedia Conference, Oct. 22, 2018, pp. 274-282.

Wang, et al., "Mancs: A Multi-task Attentional Network with Curriculum Sampling for Person Re-identification", In Proceedings of the European Conference on Computer Vision, Sep. 8, 2018, 17 Pages.

Wang, et al., "Resource Aware Person Re-identification across Multiple Resolutions", In Proceedings of the IEEE Conference on Computer Vision and Pattern Recognition, Jun. 18, 2018, pp. 8042-8051.

Wang, et al., "Shape and Appearance Context Modeling", In Proceedings of 11th International Conference on Computer Vision, Oct. 14, 2007, 8 Pages.

Wang, et al., "Spatial-Temporal Person Re-Identification", In Proceedings of the AAAI Conference on Artificial Intelligence vol. 33, Jul. 17, 2019, pp. 8933-8940.

Weinberger, et al., "Distance Metric Learning for Large Margin Nearest Neighbor Classification", In Journal of Machine Learning Research vol. 10, Issue 2, Feb. 1, 2009, pp. 207-244.

Weston, et al., "Memory Networks", In The Repository of arXiv:1410.3916v4, Dec. 24, 2014, 14 Pages.

Xin, et al., "Maximal Sparsity with Deep Networks?", In Proceedings of the 30th Conference on Neural Information Processing Systems, Dec. 5, 2016, 9 Pages.

Xiong, et al., "Person Re-Identification Using Kernel-Based Metric Learning Methods", Published in the European Conference on Computer Vision, Sep. 6, 2014, 16 Pages.

Xu, et al., "Attention-Aware Compositional Network for Person Re-identification", In Proceedings of the IEEE Conference on Computer Vision and Pattern Recognition, Jun. 18, 2018, pp. 2119-2128.

Yang, et al., "Person Re-Identification With Metric Learning Using Privileged Information", In In Journal of IEEE Transactions on Image Processing, vol. 27, Issue 2, Feb. 2018, pp. 791-805.

* cited by examiner

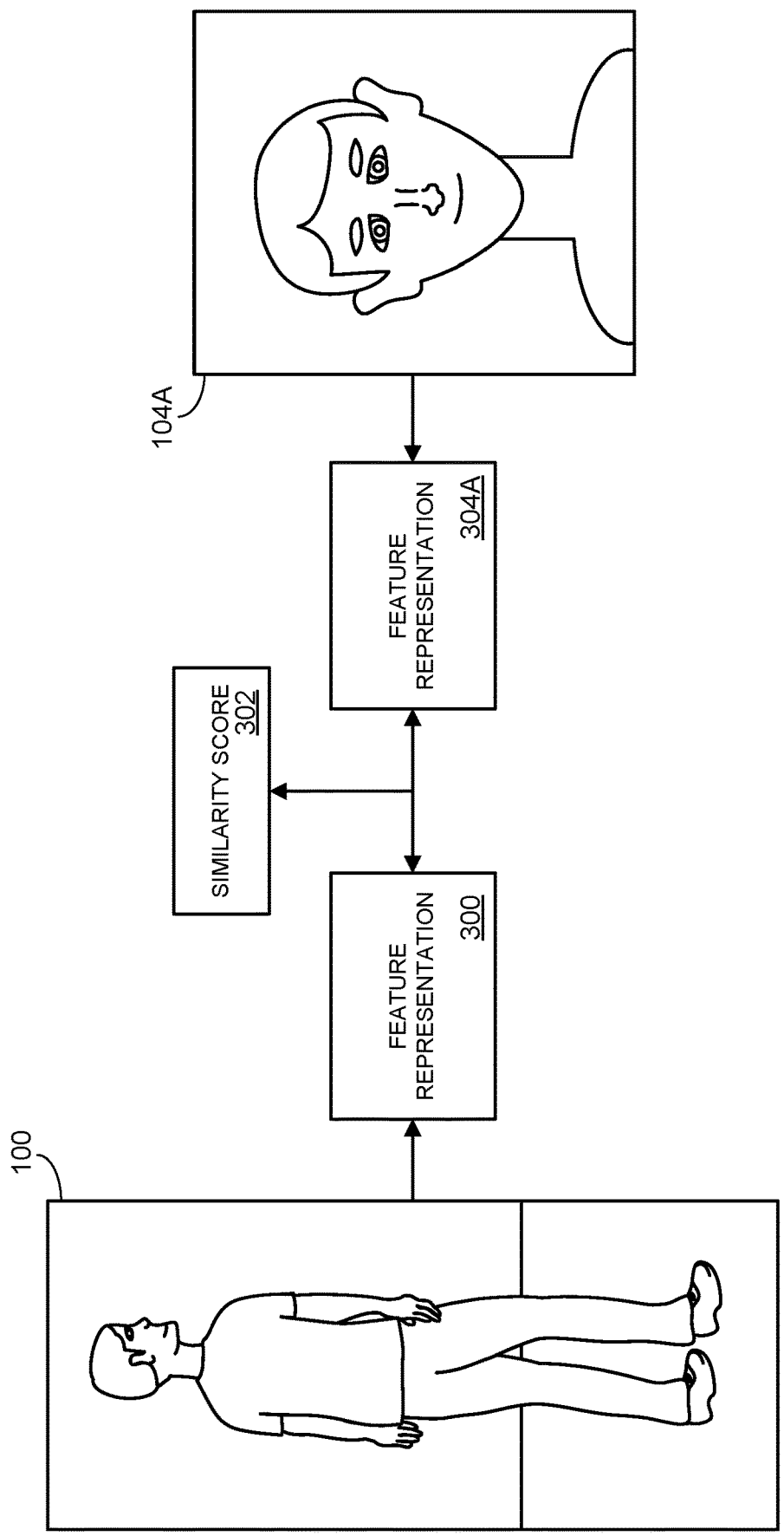

SUBJECT IDENTIFICATION BASED ON ITERATED FEATURE REPRESENTATION

BACKGROUND

Object re-identification (re-ID), or the process of recognizing a previously-identified object, is a fundamental problem in computer vision. Re-ID has wide applicability and utility in areas such as robotics, multimedia, security, forensics, autonomous driving, and cashier-free shopping, among other applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer-vision method includes recognizing a feature representation of a query image depicting an unknown subject. A similarity score is computed between the representation of the query image and feature representations of a plurality of gallery images collectively depicting two or more different subjects with at least two or more gallery images for each subject, and each gallery image having a label identifying which of the subjects is depicted. One or more updated feature representations of the query image are sequentially iterated based on one or more of the computed similarity scores. For each of the one or more updated feature representations, an updated similarity score is computed between the updated feature representation and the feature representations of each of the gallery images. The unknown subject is identified based on a gallery image having a highest updated similarity score.

BRIEF DESCRIPTION OF THE DRAWINGS

FIGS. 3A and 3B schematically illustrate computing of similarity scores between a feature representation of a query image and feature representations of gallery images.

DETAILED DESCRIPTION

Upon receiving a query image depicting an unknown subject, re-ID aims to arbitrate whether the subject has been previously observed by the same or a different camera in a same or different place at a same or different time. Due to the increasing number of camera networks and increasing prevalence of camera-based security systems, subject re-ID has become an increasingly demanding task in computer vision.

Figure 1:
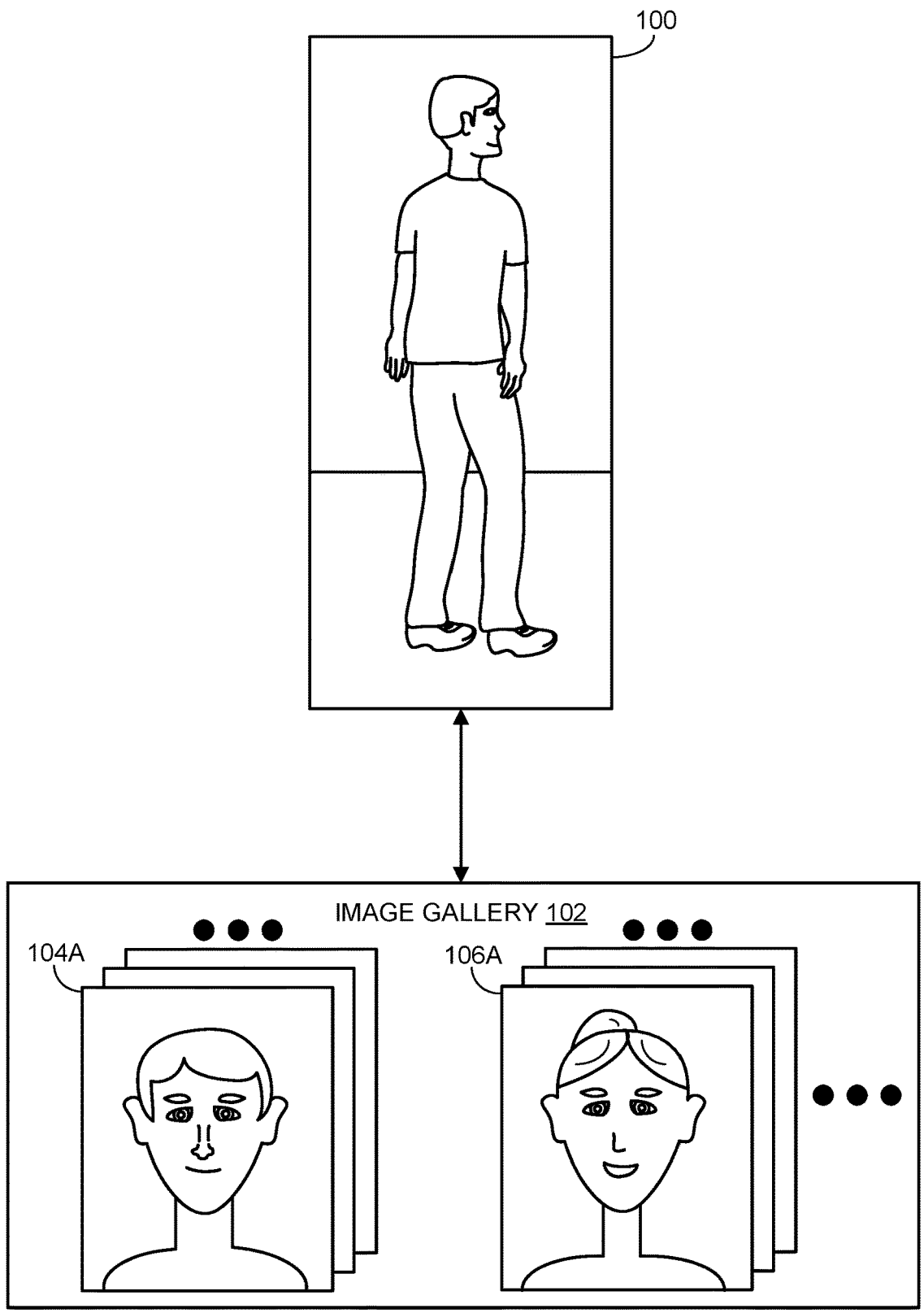
FIG. 1 schematically shows an example query image depicting an unknown subject, and an image gallery including gallery images that collectively depict a plurality of different subjects.

To illustrate this, FIG. 1 schematically shows an example re-ID scenario. Specifically, FIG. 1 shows a query image 100 depicting an unknown subject to be identified. The query image may, in one example, be an image captured by a surveillance camera—e.g., installed in a store, home, or secure facility. Query image 100 may be compared to gallery images in an image gallery 102. As shown, image gallery 102 includes a plurality of gallery images collectively depicting a plurality of different subjects. In FIG. 1, two specific gallery images 104A and 106A are shown, depicting two different subjects. As will be described in more detail below, a feature representation (e.g., a multi-dimensional feature vector) of the query image may be compared to feature representations of the various images in the image gallery. Because each gallery image is labeled with the identity of the subject depicted by the gallery image, the identity of the unknown subject in the query image may be determined based on the similarity of the query image to the various gallery images.

It will be understood that an image gallery may include any suitable number of gallery images, collectively depicting any suitable number of different subjects. In general, the plurality of gallery images will collectively depict two or more different subjects, with at least two or more gallery images for each different subject. Thus, in various examples, images in the image gallery may collectively depict tens, hundreds, thousands, or more different subjects, and each different subject may be depicted by any suitable number of gallery images. The image gallery may be stored locally by the computing system, and/or one or more gallery images may be retrieved from one or more remote image galleries—e.g., over the Internet.

Furthermore, each gallery image will have a label (e.g., metadata) identifying which of the two or more different subjects is depicted by the gallery image. Such labels may be generated in any suitable way. In one example, the labels may be manually provided by a human annotator, although the labels additionally or alternatively may be computer-generated—e.g., via suitable artificial intelligence (AI) or machine learning (ML) techniques. Examples of suitable AI and/or ML techniques are given below with respect to FIG. 7. The labels may in some cases correspond to human-readable identities of the depicted subjects—e.g., a human subject's name. In general, however, the labels need only be unique identifiers and can, for example, take the form of computer-generated serial numbers.

In some cases, labels may refer to particular pixels of a gallery image. For example, a label may indicate which specific pixels of the gallery image depict the image's corresponding subject. Furthermore, in cases where a single image depicts two or more different subjects, labels may be applied to individual pixels or sets of pixels to indicate which subject is depicted by the labeled pixels.

The query image and/or the plurality of gallery images in the image gallery may be captured in any suitable ways by any suitable cameras. In general, a query image may include any image depicting an unknown subject, regardless of its source, and may be captured for any suitable reason—in other words, use of query images need not be confined to testing or calibration scenarios, but rather may be used in practical scenarios to identify actual unknown subjects. The query image need not be captured by the same camera that captured the plurality of gallery images in the gallery.

Similarly, the plurality of gallery images need not all be captured by the same camera. In one example, the query image and plurality of gallery images may be captured by one or more cameras of a surveillance system. Each individual camera may have any suitable resolution and framerate and may be sensitive to any suitable wavelengths of light (e.g., visible-light, infrared light). Captured images may be color images, black-and-white images, greyscale images, thermal images, depth images, spectral images, and/or any other suitable type of images. Images in the gallery may be accumulated over any suitable period of time—e.g., the gallery may include images captured by a surveillance system in the last hour, day, week, or other interval of time, or gallery images may be retained indefinitely.

The present disclosure primarily focuses on scenarios in which the unidentified subject, as well as the two or more different subjects represented in the image gallery, are humans. It will be understood, however, that the techniques described herein can additionally or alternatively be applied in scenarios where the subjects are non-human. As non-limiting examples, the techniques described herein may be applied to identify subjects including non-human animals, plants, or inanimate objects (e.g., vehicles).

Furthermore, the present disclosure generally assumes that the unknown subject depicted in the query image is also depicted by two or more images in the gallery. In practical applications, however, the unknown subject may or may not already be depicted in the image gallery. Thus, comparisons between the query image and gallery images may in some cases not result in a strong enough image-to-image match to establish an identity of the unknown subject. In such cases, the re-ID process may optionally stop without identifying the unknown subject. Additionally, or alternatively, the query image of the unknown subject may be added to the image gallery as a new subject, and assigned a new identity (e.g., a computer-generated unique identifier). The new identity may in some cases be replaced with a subsequent identity—e.g., if a human annotator manually identifies the depicted subject.

Comparisons between a query image and plurality of gallery images can be sensitive to differences in image perspective and/or subject pose. In the example of FIG. 1, the unknown subject is depicted in the query image from behind and while looking away from the camera. By contrast, gallery images 104A and 106A each include close-up views of their respective subjects' faces. Thus, the similarity between the query image and gallery images may be relatively low for the purposes of identifying the unknown subject with a reasonably high confidence.

To this end, the present disclosure is directed to techniques for exploiting more information from the image gallery to improve re-ID performance. In other words, since the image gallery typically includes two or more images of the unknown subject to be identified, during the retrieval phase, images from the gallery are explored to provide auxiliary information to better locate hard positive candidates.

For example, when searching for a subject-of-interest, the query image is of the subject's frontal-view F and the gallery has images of both the person's side-view S and back-view B. Although matching B directly to F is difficult, due to the differences in perspective between the query image and gallery image, it may be possible to match F to S first and then leverage S as a bridge to match B, so as to establish the match between F and B.

Therefore, the present disclosure describes a surrogate way to exploit gallery information, by tracking a feature representation of a query image, and iteratively updating the feature representation with new information from the candidate images in the gallery. At each iteration, the updated feature representation, having been updated based on one or more gallery images, can be used to compute similarities with yet more gallery images to identify the unknown subject with higher confidence. Furthermore, such iterative updating could be applied to both the query image and all the images in the gallery, to further improve identification performance. This may be achieved via an iterative attentional aggregation model to formulate and computationally achieve such iterative updating.

Figure 2:
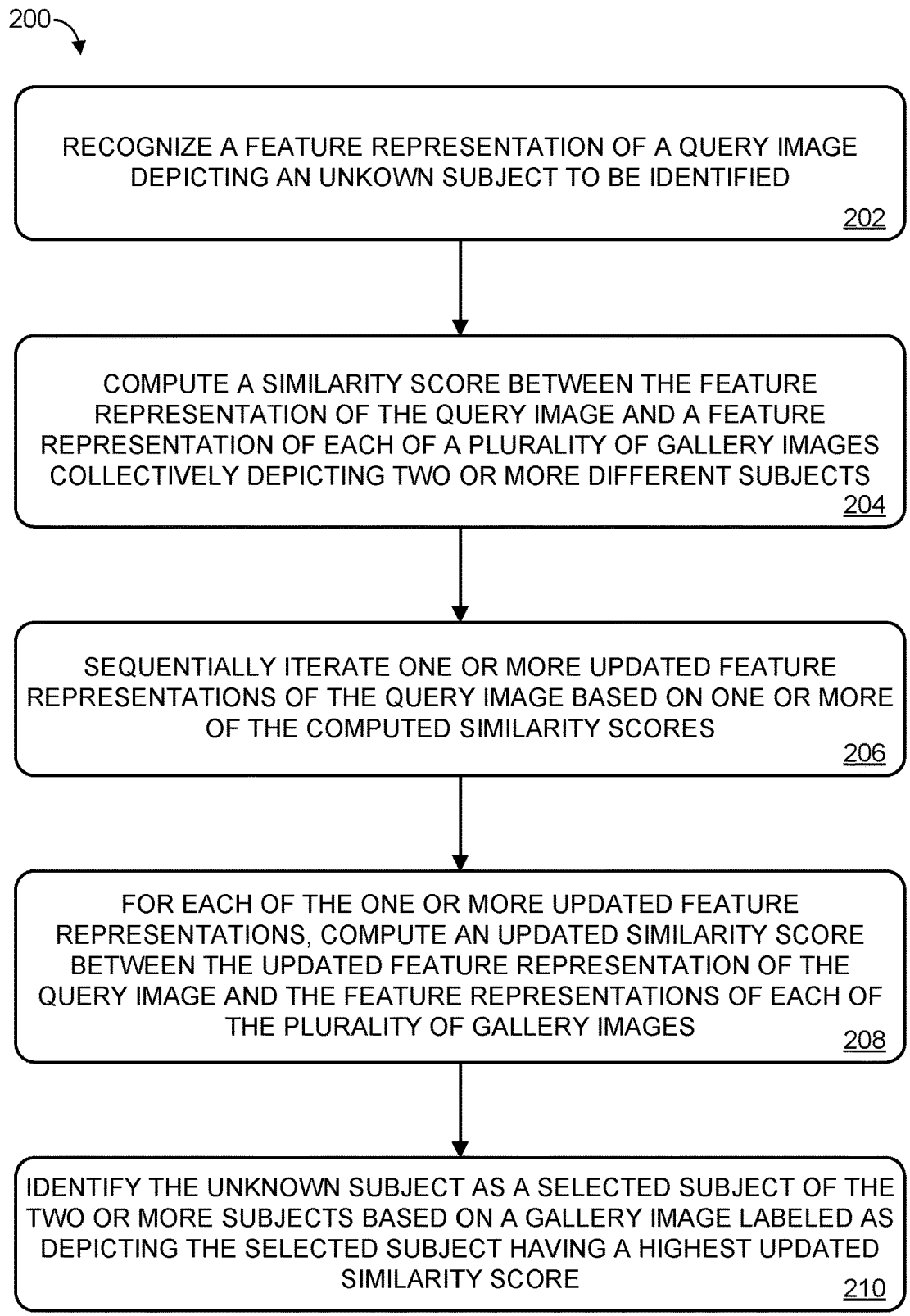
FIG. 2 illustrates an example computer-vision method.

FIG. 2 illustrates an example computer-vision method 200. Method 200 may be implemented via any suitable computing system of one or more computing devices. Each of the computing devices may have any suitable hardware configuration and form factor. In one example, method 200 may be implemented by computing system 700 described below with respect to FIG. 7.

At 202, method 200 includes recognizing a feature representation of a query image depicting an unknown subject to be identified. This is schematically illustrated with respect to FIG. 3A, again showing query image 100. FIG. 3A also schematically depicts a feature representation 300 of the query image. A feature representation may take any number of suitable forms—as one example, a feature representation may be a multi-dimensional feature vector. Any suitable approach may be used to extract one or more feature vectors, or other feature representations, from a query image. Typically, a feature representation will include some description of the underlying image data to enable comparison to other images—e.g., via Euclidean or Cosine distance comparisons.

In some cases, the computing system that performs steps of method 200 may capture the query image—e.g., via an integrated camera, or by controlling an external camera. In other cases, however, the computing system may receive the query image, or the feature representation of the query image, from a separate device. In other words, the computing system may receive the query image from a separate computing device over a suitable communications interface (e.g., via a local network, or the Internet) and extract the feature representation. Alternatively, the computing system may receive the feature representation of the query image, the feature representation having already been extracted from the query image by a different device. In any event, the computing system may "recognize" the feature representation of the query image in advance of computing similarity scores with other feature representations corresponding to various gallery images, as will be described in more detail below. Thus, as one example, "recognizing" the feature representation of the query image may include loading the feature representation into computer memory.

Returning briefly to FIG. 2, at 204, method 200 includes computing a similarity score between the feature representation of the query image and a feature representation of each of a plurality of gallery images. This is also schematically illustrated with respect to FIG. 3A. As shown, a feature representation 304A corresponding to gallery image 104A is compared to feature representation 300, corresponding to query image 100. Based on the comparison, a similarity score 302 is computed. Just as with the feature representation of the query image, the feature representations of the plurality of gallery images may also take any suitable form—e.g., multi-dimensional feature vectors. The specific format of the similarity score, as well as the method used to compute the similarity score, will depend on the nature of the feature representations. When the feature representations are feature vectors, Euclidean or Cosine distance comparisons may be used, as non-limiting examples.

The gallery images may in some cases be stored locally by the computing system implementing method 200. For example, images in the gallery may have been captured by the computing system via an integrated camera, or by controlling an external camera. Alternatively, the computing system may receive the gallery images, or feature representations of the gallery images, from a separate device. In one example, the computing system may retrieve one or more gallery images from one or more cloud-hosted image galleries via the Internet.

As discussed above, the plurality of gallery images may be selected from the image gallery, where images in the image gallery collectively depict two or more different subjects with at least two or more different gallery images for each different subject. In some cases, the plurality of gallery images for which similarity scores are computed may include all gallery images in the image gallery. In other cases, however, similarity scores may only be computed for a subset of gallery images of the image gallery—e.g., gallery images captured within a certain window of time, captured by specific cameras, or gallery images depicting specific locations.

Figure 3B:
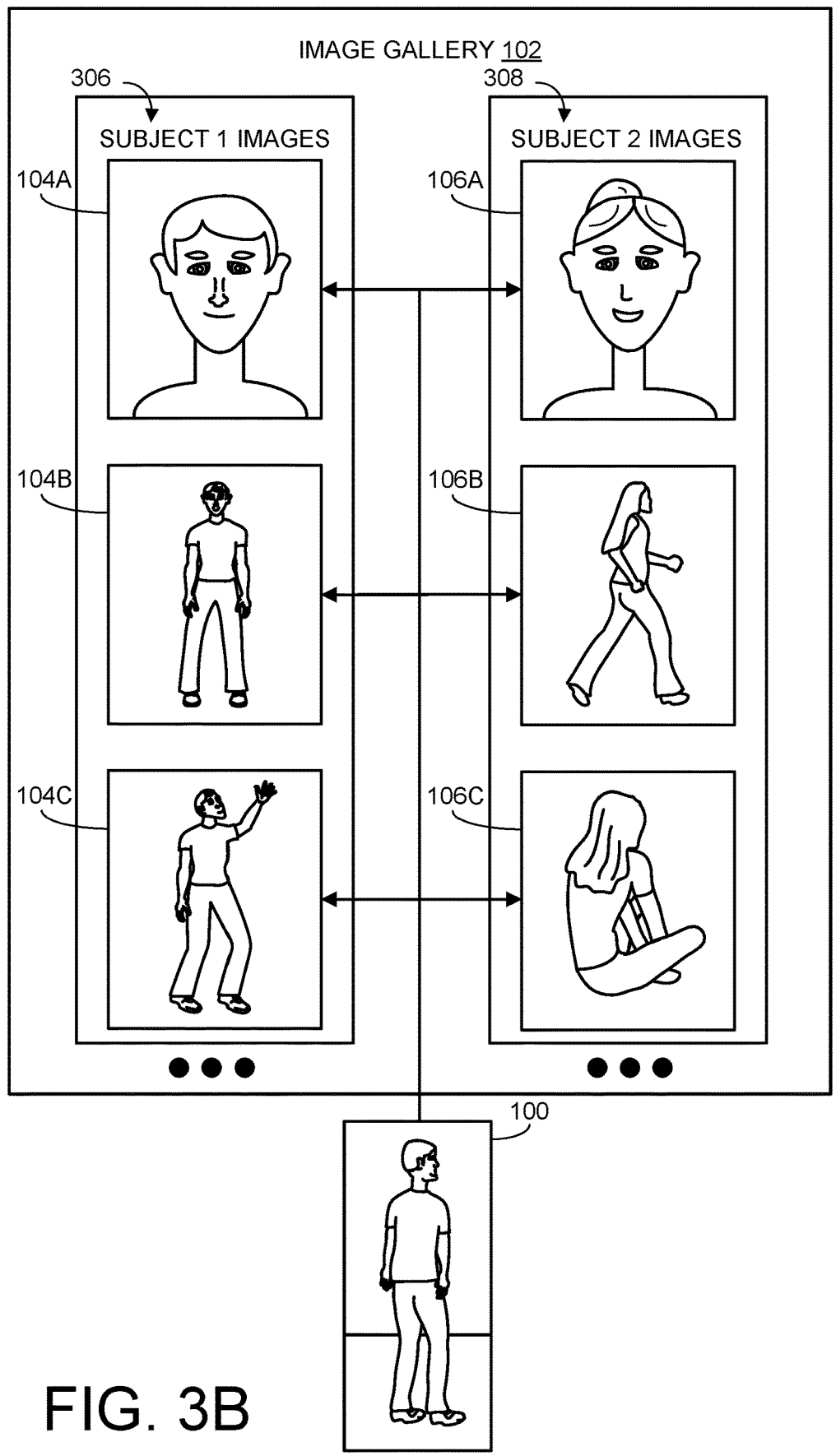

FIG. 3B illustrates comparison between query image 100 and a plurality of gallery images of an image gallery. Specifically, FIG. 3B again shows image gallery 102, including gallery images 104A and 106A depicting two different human subjects. In FIG. 3B, image gallery 102 additionally includes gallery images 104B and 104C, depicting the same subject as gallery image 104A, and gallery images 106B and 106C, depicting the same subject as gallery image 106A. A feature representation of query image 100 may be compared to feature representations of any or all of the gallery images to compute corresponding similarity scores, as described above with respect to FIG. 3A. In other words, feature representation 300 of query image 100 may be compared to feature representations of gallery images 104A, 104B, 104C, 106A, 106B, 106C, and/or any other images in the image gallery, to compute similarity scores similar to similarity score 302.

As shown in FIG. 3B, each different gallery image depicts its corresponding subject from a different perspective. For instance, gallery image 106A is a close-up view of the subject's face, while gallery image 106B depicts the subject from the side and in motion, and gallery image 106C depicts the subject from behind while the subject is sitting. As discussed above, the different gallery images may be captured at different times, different places, and/or by different cameras, resulting in two or more different gallery images for each subject that depict each subject from two or more different perspectives. In other examples, however, two or more gallery images may depict the same subject from substantially the same perspective.

Furthermore, as discussed above, each gallery image is labeled to identify which of the two or more different subject is depicted by the gallery image. This is represented in FIG. 3B by label 306, indicating that gallery images 104A-104C depict "subject 1," and label 308, indicating that gallery images 106A-106C depict "subject 2." In other examples, each individual gallery image may have an individual label, indicating which subject is depicted by that gallery image. Notably, as discussed above, the gallery image labels may take any suitable form provided that they uniquely identify the subjects depicted by the gallery image. Thus, as non-limiting alternatives to "subject 1" and "subject 2," gallery image labels may provide a subject's name, or a computer-generated serial number (e.g., #1007, #3629).

Returning briefly to FIG. 2, at 206, method 200 includes sequentially iterating one or more updated feature representations of the query image based on one or more of the computed similarity scores. In general, this may include identifying one or more gallery images having corresponding feature representations that in turn have the one or more highest computed similarity scores with the feature representation of the query image. For example, the K-nearest neighbor gallery images may be identified, where K may be any suitable positive integer. The feature representations of the one or more identified gallery images may then be merged with the feature representation of the query image to give a first updated feature representation of the one or more updated feature representations. Merging examples are provided below.

Figure 4:
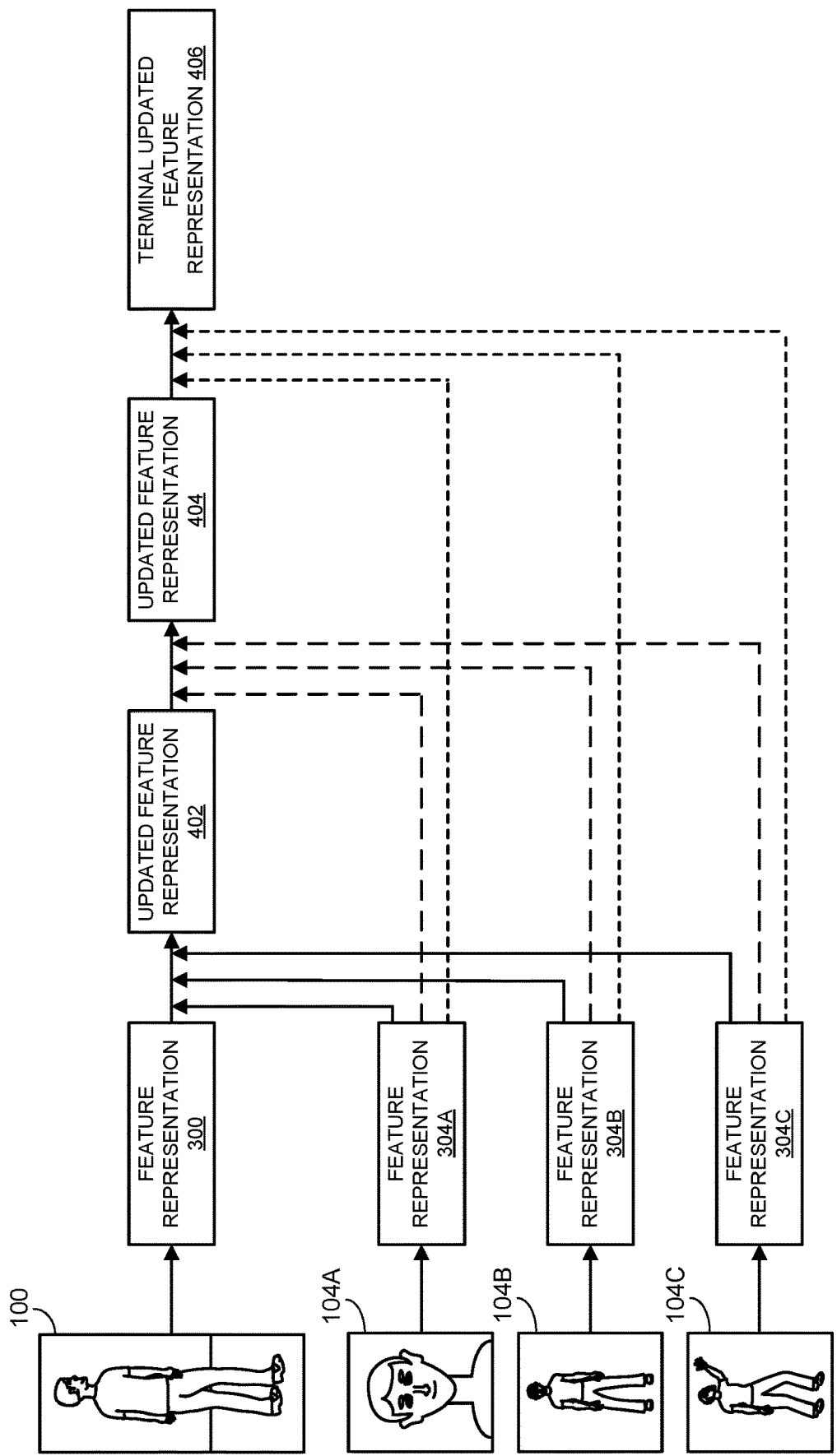
FIG. 4 schematically illustrates iterating an updated feature representation of a query image.

This is schematically illustrated with respect to FIG. 4, again showing query image 100 along with gallery images 104A-104C. FIG. 4 also shows feature representations 300, 304A, 304B, and 304C, corresponding to query image 100 and gallery images 104A-104C, respectively. After computing similarity scores between the feature representation of the query image and the feature representations of the gallery images, gallery images 104A-C are identified as having the highest computed similarity scores with the feature representation of the query image. Thus, feature representation 300 is merged with feature representations 304A-C to give a first updated feature representation 402. In this example, the feature representation of the query image is merged with feature representations of three gallery images. In general, however, the number of gallery image representations merged with the query image representation may be any suitable positive integer.

FIG. 4 only shows the feature representation of the query image, along with feature representations for gallery images labeled as depicting "subject 1" in FIG. 3B. It will be understood, however, that the feature representation of the query image may be compared to feature representations of any or all of the images in the gallery, including images depicting "subject 2" or other subjects.

In some cases, the feature representation of the query image may only be merged with the feature representations of the identified gallery images having similarity scores that exceed a threshold. This may mitigate the risk that a feature representation of a query image may be merged with feature representations of gallery images depicting a different subject. Any suitable threshold may be used—for example, a 70% similarity score.

A non-limiting approach for iterating an updated feature representation will now be described. For the purposes of this example, the feature representation of the query image is only merged with one feature representation of one gallery image. It will be understood, however, that the feature representation of the query image may be merged with feature representations of one or more gallery images at each iteration step.

In the present example, the query image is denoted as q, and the feature representation of the query image at an iteration index t is denoted as $x_q^t$. In other words, the first updated feature representation is iterated at iteration index t, while subsequent updated feature representations may be iterated in subsequent iteration indices (e.g., t+1, t+2, ... $t_N$). Continuing, the one or more gallery images identified as having the highest similarity scores with $x_q^t$ include a gallery image denoted as g1, and the feature representation of g1 is denoted as $x_{g1}$. The metric developed for computing similarity (or distance) between the corresponding image pairs is denoted as $s(x, y)$, or $s_{xy}$. Thus, the computed similarity score between $x_q^t$ and g1 is denoted as $s_{qg1}$. Accordingly, a first updated feature representation $x_q^{t+1}$ may be calculated at a subsequent iteration index t+1 via a merging function m and an attention function $f$ as follows:

$$x_q^{t+1} = m(x_q^t, f(\{s_{qg1}, x_{g1}^t\}))$$

The merging function m can include calculating:

$$m(x_q^t, x_{g1}) = \alpha x_q^t + (1-\alpha) x_{g1}$$

Merging function m may be a linear merging function that updates the impression with new information via a forgetting parameter $\alpha$. Different values of $\alpha$ can be used to beneficially control the updating intensity, depending on the implementation.

In some cases, the feature representations of the one or more identified gallery images may be merged with the feature representation of the query image to an extent proportional to a magnitude of the one or more highest similarity scores, corresponding to the one or more gallery images. In other words, when merging the feature representation of the query image with the feature representations of the identified gallery images, a greater or lesser weighting may be applied to the feature representations of each identified gallery image, based on whether that gallery image's computed similarity score is relatively higher or lower. For example, in FIG. 4, each of feature representations 304A, 304B, and 304C may be merged with feature representation 300 with different weightings, proportional to each gallery image's computed similarity score. This may be achieved through the use of attention function $f$.

The attention function $f$ can include, for each gallery image $g_i$ in a set of K-nearest neighbors $N_q$ of the query image q within image gallery N:

$$f(s_{qN_q}, x_q^t) = \sum_{g_i \in N_q} softmax(s_{qg_i}) x_{g_i}$$

In other words, the attention function f may be a soft attentional aggregation function defined upon q's top-K nearest neighbors to avoid involving noisy samples.

In the present example, the merging and attention functions are designed to be relatively simple. However, more advanced merging and attention functions may be beneficial for larger performance gain. For example, LSTM cells, memory networks, and/or other suitable AI or ML techniques could be leveraged to automatically learn m and/or f. Examples of suitable AI and ML techniques are described below with respect to FIG. 7. Due to the iterative nature of the techniques described herein, it may sometimes be possible to obtain a list of historical representations and similarities, and thus apply all or part of the historical representations (or similarities) to achieve an ensemble when computing the final retrieval. As an additional benefit of the techniques described herein, so long as m and f are differential with respect to the feature representation of the query image, it may be possible to back-propagate information and further fine-tune the feature representation.

The above process only considered merging the feature representation of the query image with a single feature representation corresponding to a single gallery image, g1. However, as discussed above, the feature representation of the query image may in some cases be merged with multiple feature representations of multiple gallery images at once.

In other words, the one or more identified gallery images may include a set of gallery images g1, g2, ... $g_N$, which may have respective highest computed similarity scores $s_{qg1}, s_{qg2}, \ldots s_{qgN}$. Thus, calculating the first updated feature representation $x_q^{t+1}$ may include:

$$x_q^{t+1} = m(x_q^t, f(\{s_{qg1}, x_{g1}^t\}, \{s_{qg2}, x_{g2}^t\}, \ldots \{s_{qgN}, x_{gN}^t\}))$$

Notably, the above process may be repeated multiple times, to sequentially iterate multiple updated feature representations. In any case, once each updated feature representation is iterated, it may again be compared to feature representations of gallery images of the gallery. Thus, returning briefly to FIG. 2, at 208, method 200 includes, for each of the one or more updated feature representations of the query image, computing an updated similarity score between the updated feature representation of the query image and the feature representations of each of the plurality of gallery images, to give one or more updated similarity scores.

Returning to FIG. 4, as discussed above, feature representation 300 is merged with feature representations 304A-C to give an updated feature representation 402. Updated feature representation 402 may then be compared with feature representations of the plurality of gallery images to compute updated similarity scores. This is described in more detail with respect to FIG. 5, again showing updated feature representation 402. As shown, updated feature representation 402 is compared to feature representation 304C, corresponding to gallery image 104C. This results in an updated similarity score 500. Computing similarity scores between feature representations may be done substantially as described above with respect to FIG. 3A. For example, in the case where the feature representations are feature vectors, computing similarity scores may include calculating Euclidean or cosine distances between the feature vectors.

The iteration process described above may be repeated any suitable number of times. In other words, after computing updated similarity scores, the updated feature representation may again be iterated to give a second updated feature representation. This may be done by merging the first updated feature representation of the query image with feature representations of one or more gallery images identified as having the one or more highest updated similarity score. In other words, the first updated feature representation of the query image may be merged with its K-nearest neighbors within the image gallery, similar to the process described above. This is also illustrated with respect to FIG. 4. Once updated feature representation 402 is generated, it is again compared to the feature representations of the plurality of gallery images to compute updated similarity scores as discussed above. From there, it is again merged with feature representations 304A-C to give a second updated feature representation 404, where the weightings applied to the feature representations of the gallery images during merging may be proportional to each gallery image's updated similarity score.

In FIG. 4, one more iteration is performed, in which updated feature representation 404 is again merged with feature representations 304A-C to give a terminal updated feature representation 406. In general, however, any suitable number of updated feature representations may be iterated, including only one updated feature representation. Any suitable criteria may be used to determine when the sequential iteration process should be stopped. In one example, the process may continue for a preset number of iterations before automatically stopping—e.g., five iterations. In another example, the process may continue until a terminal updated feature representation is generated having a similarity score with a feature representation of a gallery image that is above a threshold similarity. Any suitable similarity threshold may be used depending on the implementation— e.g., a 95% similarity threshold may be suitable.

Furthermore, in FIG. 4, the feature representation of the query image is merged with the feature representations of the same gallery images at each iteration step. In practical applications, however each updated feature representation may be merged with its K-nearest neighbors within the image gallery, and each set of K-nearest neighbors need not be the same. Similarly, the number of K-nearest neighbors identified at each iteration step may also vary.

Figure 5:
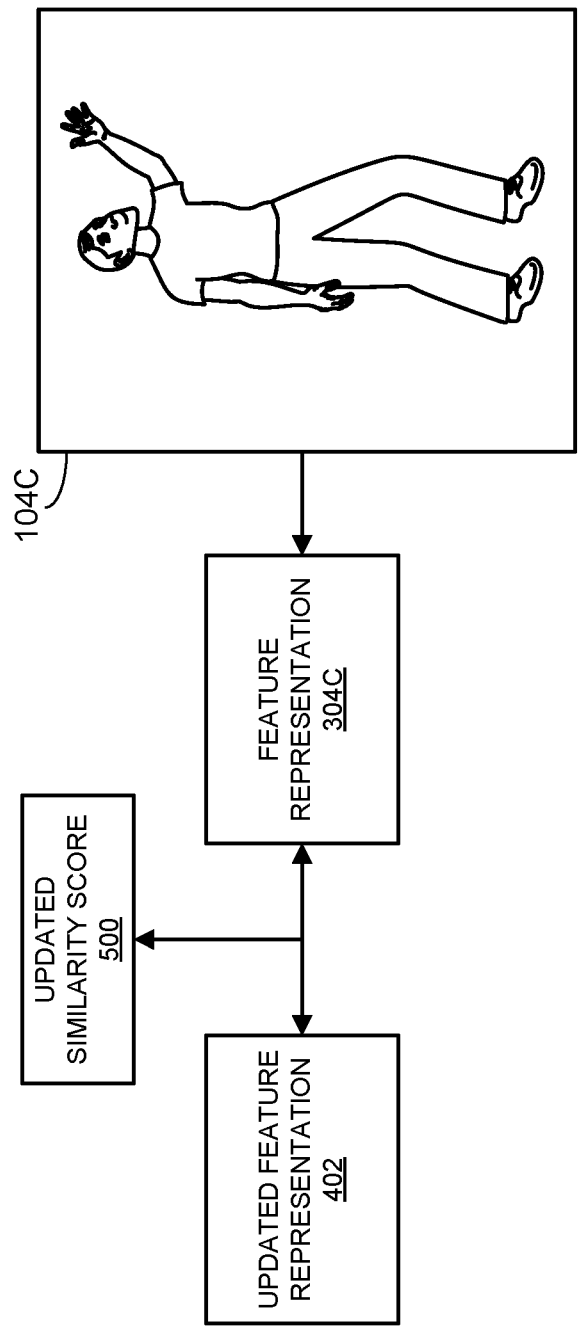
FIG. 5 schematically illustrates computing an updated similarity score between an updated feature representation of a query image and a feature representation of a gallery image.

In any case, and regardless of the number of iterations performed, an updated feature representation of a query image may be used to identify the subject depicted in the query image. Thus, returning briefly to FIG. 2, at 210, method 200 includes computer-identifying the unknown subject as a selected subject of the two or more subjects represented in the plurality of gallery images. This may be done based on a gallery image labeled as depicting the selected subject having a highest updated similarity score. In the example of FIG. 5, an updated similarity score 500 is computed between updated feature representation 402 and feature representation 304C. If updated similarity score 500 is higher than other updated similarity scores, computed for feature representations of other gallery images, then the unknown subject in the query image may be identified as the subject depicted by gallery image 104C. Thus, the unknown subject may be identified as "subject 1," as given by label 306 shown in FIG. 3B.

The present disclosure has thus far primarily focused on iterating the feature representation of the query image. However, the gallery images may themselves be iterated in addition to, or instead of, the query image. In other words, the computing system may iterate one or more updated feature representations of one or more gallery images of the plurality of gallery images. From there, the one or more updated similarity scores described above may be computed between the one or more updated feature representations of the query image and the one or more updated feature representations of the one or more gallery images. It believed that such iteration of the gallery images can improve overall performance of the subject identification process.

Figure 6:
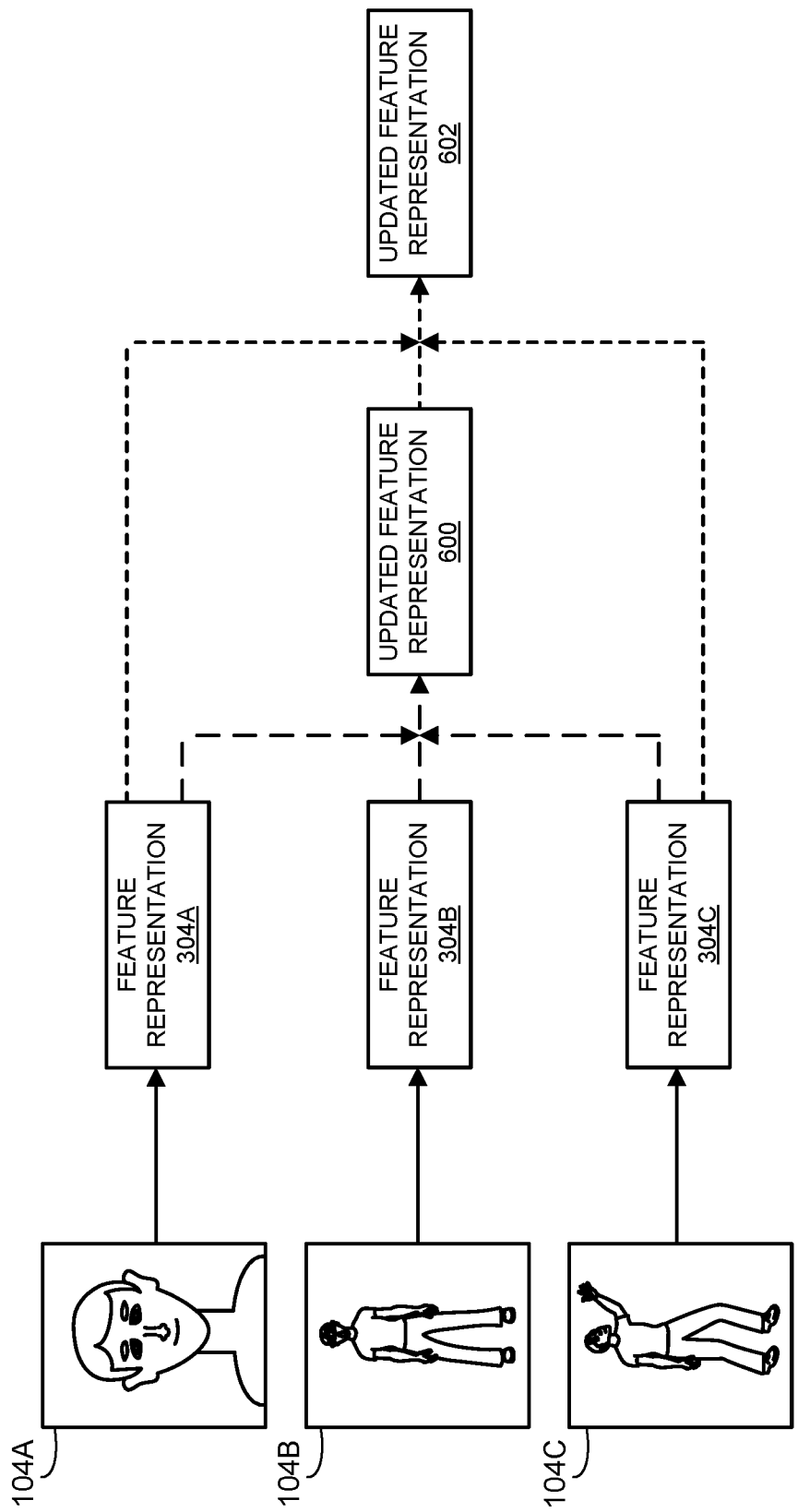
FIG. 6 schematically illustrates iterating updated feature representations of gallery images of an image gallery.

This is schematically illustrated with respect to FIG. 6. Specifically, FIG. 6 again shows gallery images 104A-104C, along with their corresponding feature representations 304A-304C. However, instead of merging feature representations of gallery images with feature representations of a query image, the feature representations of the gallery images are be merged with one another. For example, similarity scores may be computed between feature representations corresponding to sets of gallery images—e.g., sets of gallery images labeled as depicting the same subject. Gallery image sets having the highest computed similarity scores may then be merged substantially as described above. A non-limiting computational process for iterating feature representations of gallery images will be described in more detail below.

In FIG. 6, feature representations 304A-304C are merged to give an updated feature representation 600. Updated representation 600 is then again merged with feature representations 304A-C to give a second updated feature representation 602. It will be understood, however, that any suitable number of iterations may be performed to merge any suitable number of feature representations, corresponding to different gallery images. In any case, once generated, an updated feature representation may be compared with a feature representation of a query image (or an updated feature representation of a query image) to identify an unknown subject. In other words, and to reuse the example of FIG. 5, updated feature representation 402 may be compared to an updated feature representation of one or more gallery images (e.g., representation 602) to compute an updated similarity score.

Iteration of gallery images may be performed in various suitable ways. In one example, to iterate the feature representations of the gallery images, a matrix D may be formulated, where d is the feature dimension, and:

$$D = [x_q, x_{g1}, \ldots, x_{gN}] \in \mathbb{R}^{d \times (N+1)}$$

Additionally, a similarity matrix S may be formulated:

$$S \in \mathbb{R}^{(N+1) \times (N+1)}$$

After the similarity matrix is computed, the diagonal elements of S may be set to $\alpha$. The non-diagonal elements may be multiplied by $(1-\alpha)$ to achieve an update matrix U. Then the representation updates of both the query and gallery images can be obtained simultaneously via matrix multiplication $D^{t+1} = D^t U$.

To summarize the foregoing, in one non-limiting example, the iterative aggregation process described herein may be expressed algorithmically as follows:

Input: a, K, N, D = $[x_q, x_{g1}, \ldots, x_{gN}] \in \mathbb{R}^{d \times (N+1)}$;
Calculate initial similarity matrix: $S \in \mathbb{R}^{(N+1) \times (N+1)}$;
For t=1:N do:
    Keep top-K elements of $S^{t-1}$ for each row;
    $S_{topk}^{t-1}$ = topK $(S^{t-1})$;
    Normalize $S_{topk}^{t-1}$
    Calculate update matrix: $U^t = \alpha I + (1 - \alpha) S_{topk}^{t-1}$
    Update D: $D^t = D^{t-1} U^t$
    Calculate similarity matrix: $S^t \in \mathbb{R}^{(N+1) \times (N+1)}$;
Return $S^N, D^N$ The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
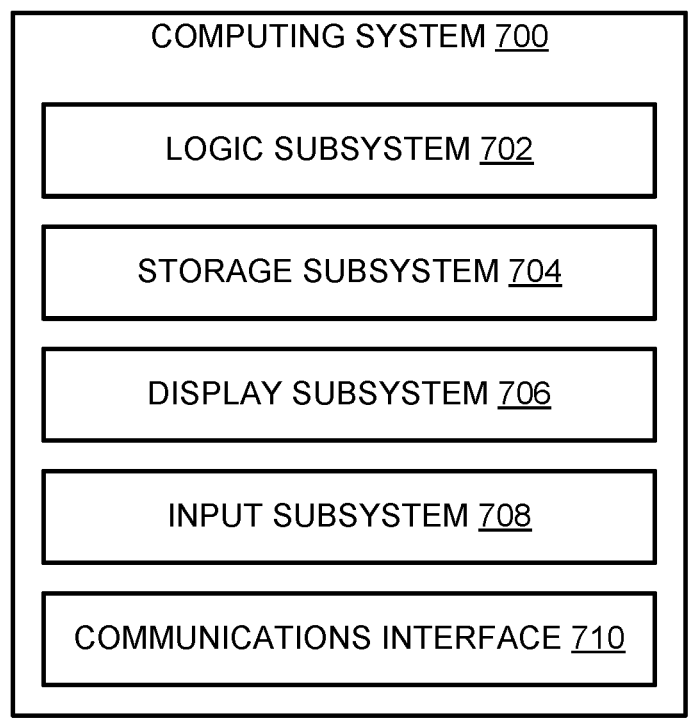
FIG. 7 schematically shows an example computing system.

FIG. 7 schematically shows a simplified representation of a computing system 700 configured to provide any to all of the compute functionality described herein. For example, computing system 700 may be configured to implement steps of method 200, described above with respect to FIG. 2. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or supersegmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. In particular, users may be provided with control over whether images depicting them are included in, or compared to, an image gallery as discussed above. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a computer-vision method comprises: recognizing, at a computing system, a feature representation of a query image depicting an unknown subject to be identified; computing a similarity score between the feature representation of the query image and a feature representation of each of a plurality of gallery images, the plurality of gallery images collectively depicting two or more different subjects with at least two or more gallery images for each different subject, and each gallery image having a label identifying which of the two or more subjects is depicted by the gallery image; sequentially iterating one or more updated feature representations of the query image based on one or more of the computed similarity scores; for each of the one or more updated feature representations of the query image, computing an updated similarity score between the updated feature representation of the query image and the feature representations of each of the plurality of gallery images to give one or more updated similarity scores; and computer-identifying the unknown subject as a selected subject of the two or more subjects based on a gallery image labeled as depicting the selected subject having a highest updated similarity score. In this example or any other example, sequentially iterating the one or more updated feature representations of the query image includes identifying one or more gallery images having corresponding feature representations with one or more highest computed similarity scores with the feature representation of the query image, and merging the feature representations of the one or more identified gallery images with the feature representation of the query image to give a first updated feature representation of the one or more updated feature representations. In this example or any other example, the feature representations of the one or more identified gallery images are each merged with the feature representation of the query image to an extent proportional to a magnitude of the one or more highest computed similarity scores. In this example or any other example, the query image is q, the feature representation of the query image at an iteration index t is $x_q^t$, the one or more identified gallery images include an identified gallery image g1, the feature representation of the identified gallery image g1 is $x_{g1}^t$, the highest computed similarity score for the identified gallery image g1 is $s_{qg1}$, and wherein sequentially iterating the one or more updated feature representations includes calculating the first updated feature representation $x_q^{t+1}$ at a subsequent iteration index t+1 via a merging function m and an attention function $f$, by calculating:

$$x_q^{t+1} = m(x_q^t, f(\{s_{qg1}, x_{g1}^t\}))$$

In this example or any other example, the merging function m includes, for a forgetting parameter α:

$$m(x_q^t, x_{g1}) = \alpha x_q^t + (1-\alpha) x_{g1}$$

In this example or any other example, the attention function $f$ includes, for each gallery image $g_i$ in a set of K-nearest neighbors $N_q$ of the query image q within image gallery N:

$$f(s_{qN_q}, x_q^t) = \sum_{g_i \in N_q} softmax(s_{qg_i}) x_{g_i}$$

In this example or any other example, the one or more identified gallery images include identified gallery images g1, g2, ... $g_N$ having respective highest computed similarity scores $s_{qg1}$, $s_{qg2}$, ... $s_{qgN}$, and wherein calculating the first updated feature representation $x_q^{t+1}$ includes:

$$x_q^{t+1} = m(x_q^t, f(\{s_{qg1}, x_{g1}^t\}, \{s_{qg2}, x_{g2}^t\}, ... \{s_{qgN}, x_{gN}^t\}))$$

In this example or any other example, sequentially iterating the one or more updated feature representations of the query image continues until a terminal updated feature representation is generated having a computed similarity score with a feature representation of a gallery image that is above a threshold similarity. In this example or any other example, the method further comprises iterating one or more updated feature representations of one or more gallery images of the plurality of gallery images, and wherein the one or more updated similarity scores are computed between the one or more updated feature representations of the query image and the one or more updated feature representations of the one or more gallery images. In this example or any other example, the feature representation of the query image and the feature representations of the plurality of gallery images are feature vectors. In this example or any other example, the plurality of gallery images includes all gallery images in an image gallery. In this example or any other example, the two or more gallery images for each different subject depict each different subject from two or more different perspectives. In this example or any other example, the unknown subject and the two or more different subjects are humans.

In an example, a computing system comprises: a logic subsystem; and a storage subsystem holding instructions executable by the logic subsystem to: computer-recognize a feature representation of a query image depicting an unknown subject to be identified; compute a similarity score between the feature representation of the query image and a feature representation of each of a plurality of gallery images, the plurality of gallery images collectively depicting two or more different subjects with at least two or more gallery images for each different subject, and each gallery image having a label identifying which of the two or more subjects is depicted by the gallery image; sequentially iterate one or more updated feature representations of the query image based on one or more of the computed similarity scores; for each of the one or more updated feature representations of the query image, compute an updated similarity score between the updated feature representation of the query image and the feature representations of each of the plurality of gallery images to give one or more updated similarity scores; and computer-identify the unknown subject as a selected subject of the two or more subjects based on a gallery image labeled as depicting the selected subject having a highest updated similarity score. In this example or any other example, sequentially iterating the one or more updated feature representations of the query image includes identifying one or more gallery images having corresponding feature representations with one or more highest computed similarity scores with the feature representation of the query image, and merging the feature representations of the one or more identified gallery images with the feature representation of the query image to give a first updated feature representation of the one or more updated feature representations. In this example or any other example, the query image is q, the feature representation of the query image at an iteration index t is $x_q^t$, the one or more identified gallery images include an identified gallery image g1, the feature representation of the identified gallery image g1 is $x_{g1}^t$, the highest computed similarity score for the identified gallery image g1 is $s_{qg1}$, and wherein sequentially iterating the one or more updated feature representations includes calculating the first updated feature representation $x_q^{t+1}$ at a subsequent iteration index t+1 via a merging function m and an attention function $f$, by calculating:

$$x_q^{t+1} = m(x_q^t, f(\{s_{qg1}, x_{g1}^t\}))$$

In this example or any other example, the one or more identified gallery images include identified gallery images g1, g2, ... $g_N$ having respective highest computed similarity scores $s_{qg1}$, $s_{qg2}$, ... $s_{qgN}$, and wherein calculating the first updated feature representation $x_q^{t+1}$ includes:

$$x_q^{t+1} = m(x_q^t, f(\{s_{qg1}, x_{g1}^t\}, \{s_{qg2}, x_{g2}^t\}, ... \{s_{qgN}, x_{gN}^t\}))$$

In this example or any other example, the two or more gallery images for each different subject depict each different subject from two or more different perspectives. In this example or any other example, the unknown subject and the two or more different subjects are humans.

In an example, a computer-vision method comprises: recognizing, at a computing system, a feature representation of a query image depicting an unknown human subject to be identified; computing a similarity score between the feature representation of the query image and a feature representation of each of a plurality of gallery images, the plurality of gallery images collectively depicting two or more different human subjects with at least two or more gallery images for each different human subject, the two or more gallery images depicting each different subject from two or more perspectives, and each gallery image having a label identifying which of the two or more human subjects is depicted by the gallery image; sequentially iterating one or more updated feature representations of the query image based on one or more of the computed similarity scores; iterating one or more updated feature representations of one or more gallery images of the plurality of gallery images; for each of the one or more updated feature representations of the query image, computing an updated similarity score between the updated feature representation of the query image and the one or more updated feature representations of the one or more gallery images to give one or more updated similarity scores; and computer-identifying the unknown human subject as a selected human subject of the two or more human subjects based on a gallery image labeled as depicting the selected human subject having a highest updated similarity score.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-vision method, comprising:
   recognizing, at a computing system, a feature representation of a query image depicting an unknown subject to be identified;
   computing a similarity score between the feature representation of the query image and a feature representation of each of a plurality of gallery images, the plurality of gallery images collectively depicting two or more different subjects with at least two or more gallery images for each different subject, and each gallery image having a label identifying which of the two or more subjects is depicted by the gallery image;
   sequentially iterating one or more updated feature representations of the query image based on one or more of the computed similarity scores;
   iterating one or more updated feature representations of one or more gallery images of the plurality of gallery images;
   for each of the one or more updated feature representations of the query image, computing an updated similarity score between the updated feature representation of the query image and the updated feature representations of each of the one or more gallery images of the plurality of gallery images to give one or more updated similarity scores; and
   computer-identifying the unknown subject as a selected subject of the two or more subjects based on a gallery image labeled as depicting the selected subject having a highest updated similarity score.

2. The computer-vision method of claim 1, wherein sequentially iterating the one or more updated feature representations of the query image includes identifying one or more gallery images having corresponding feature representations with one or more highest computed similarity scores with the feature representation of the query image, and merging the feature representations of the one or more identified gallery images with the feature representation of the query image to give a first updated feature representation of the one or more updated feature representations.

3. The computer-vision method of claim 2, wherein the feature representations of the one or more identified gallery images are each merged with the feature representation of the query image to an extent proportional to a magnitude of the one or more highest computed similarity scores.

4. The computer-vision method of claim 3, wherein sequentially iterating the one or more updated feature representations of the query image includes calculating the first updated feature representation at a subsequent iteration index via a merging function and an attention function.

5. The computer-vision method of claim 4, wherein the merging function is a linear merging function that outputs the first updated feature representation of the query image using a forgetting parameter.

6. The computer-vision method of claim 4, wherein the attention function is a soft attentional aggregation function defined for a set of K-nearest neighbors of the query image.

7. The computer-vision method of claim 4, wherein the one or more identified gallery images include at least two identified gallery images having respective highest computed similarity scores and wherein calculating the first updated feature representation includes applying the merging function and the attention function to feature representations of the at least two identified gallery images.

8. The computer-vision method of claim 1, wherein sequentially iterating the one or more updated feature representations of the query image continues until a terminal updated feature representation is generated having a computed similarity score with a feature representation of a gallery image that is above a threshold similarity.

9. The computer-vision method of claim 1, wherein the feature representation of the query image and the feature representations of the plurality of gallery images are feature vectors.

10. The computer-vision method of claim 1, wherein the plurality of gallery images includes all gallery images in an image gallery.

11. The computer-vision method of claim 1, wherein the two or more gallery images for each different subject depict each different subject from two or more different perspectives.

12. The computer-vision method of claim 1, wherein the unknown subject and the two or more different subjects are humans.

13. A computing system, comprising:
   a logic subsystem; and a storage subsystem holding instructions executable by the logic subsystem to:

computer-recognize a feature representation of a query image depicting an unknown subject to be identified;

compute a similarity score between the feature representation of the query image and a feature representation of each of a plurality of gallery images, the plurality of gallery images collectively depicting two or more different subjects with at least two or more gallery images for each different subject, and each gallery image having a label identifying which of the two or more subjects is depicted by the gallery image;

sequentially iterate an updated feature representation of the query image by identifying one or more identified gallery images having corresponding feature representations with one or more highest computed similarity scores with the feature representation of the query image, and merging the feature representations of the one or more identified gallery images with the feature representation of the query image to an extent proportional to a magnitude of the one or more highest computed similarity scores to give the updated feature representation;

for the updated feature representation of the query image, compute an updated similarity score between the updated feature representation of the query image and the feature representations of each of the plurality of gallery images to give one or more updated similarity scores; and computer-identify the unknown subject as a selected subject of the two or more subjects based on a gallery image labeled as depicting the selected subject having a highest updated similarity score.

14. The computing system of claim 13, wherein sequentially iterating the updated feature representation includes calculating the updated feature representation at a subsequent iteration index via a merging function and an attention function.

15. The computing system of claim 14, wherein the one or more identified gallery images include at least two identified gallery images having respective highest computed similarity scores, and wherein calculating the updated feature representation includes applying the merging function and the attention function to feature representations of the at least two identified gallery images.

16. The computing system of claim 13, wherein the two or more gallery images for each different subject depict each different subject from two or more different perspectives.

17. The computing system of claim 13, wherein the unknown subject and the two or more different subjects are humans.

18. A computer-vision method, comprising:

recognizing, at a computing system, a feature representation of a query image depicting an unknown human subject to be identified;

computing a similarity score between the feature representation of the query image and a feature representation of each of a plurality of gallery images, the plurality of gallery images collectively depicting two or more different human subjects with at least two or more gallery images for each different human subject, the two or more gallery images depicting each different subject from two or more perspectives, and each gallery image having a label identifying which of the two or more human subjects is depicted by the gallery image;

sequentially iterating one or more updated feature representations of the query image based on one or more of the computed similarity scores;

iterating one or more updated feature representations of one or more gallery images of the plurality of gallery images;

for each of the one or more updated feature representations of the query image, computing an updated similarity score between the updated feature representation of the query image and the one or more updated feature representations of the one or more gallery images to give one or more updated similarity scores; and computer-identifying the unknown human subject as a selected human subject of the two or more human subjects based on a gallery image labeled as depicting the selected human subject having a highest updated similarity score.

* * * * *